United States Patent [19]

Ferrali

[11] Patent Number: 4,577,498

[45] Date of Patent: Mar. 25, 1986

[54] DOUBLE MULTIPLE CHANGE-OVER VALVE, FOR CONTROLLING THE OPERATION OF A WATER TREATMENT PLANT

[75] Inventor: Luigi Ferrali, Florence, Italy

[73] Assignee: S.I.A.T.A. Società Italiana Apparecchiature Trattamento Acqua S.p.A., Florence, Italy

[21] Appl. No.: 579,287

[22] Filed: Feb. 14, 1984

Related U.S. Application Data

[63] Continuation of Ser. No. 356,303, Mar. 10, 1982.

[30] Foreign Application Priority Data

Mar. 16, 1981 [IT] Italy .................. 9364 A/81

[51] Int. Cl.[4] .................. G01F 15/00; B01D 29/42
[52] U.S. Cl. .................. 73/198; 137/596.18; 137/625.68; 137/885; 210/87; 210/278; 210/426
[58] Field of Search .................. 73/198, 861.78; 137/596.18, 597, 625.68, 885; 210/87, 191, 270, 277, 278, 279, 288, 428, 426

[56] References Cited

U.S. PATENT DOCUMENTS

| | | | |
|---|---|---|---|
| 2,359,802 | 10/1944 | Stephens | 137/625.68 |
| 3,398,090 | 8/1968 | Bartell et al. | 210/278 X |
| 3,880,003 | 4/1975 | Jameson | 73/861.78 |
| 3,962,089 | 6/1976 | Fulukawa | 210/191 |
| 4,235,718 | 11/1980 | Lopez | 210/424 X |

*Primary Examiner*—Herbert Goldstein
*Attorney, Agent, or Firm*—Hopgood, Calimafde, Kalil, Blaustein & Judlowe

[57] ABSTRACT

A multiple change-over valve which can be set into various positions suitable for the operation of a water treatment plant. A moulded synthetic resin body defines two valve units with seats for two movable assemblies controlled by cylinder-piston systems such as to assume two positions; each of the two movable assemblies comprises at one end a cavity with lateral apertures, and in an intermediate position longitudinal passages for cooperating with various passages, including transverse passages, between the two seats, and with passages for communication with the top and bottom of a resin column. A suction feeder for the regenerating solution, in the form of a venturi tube, is fixed between the water feed and the top of the column in order to operate when the column is connected to discharge.

6 Claims, 14 Drawing Figures

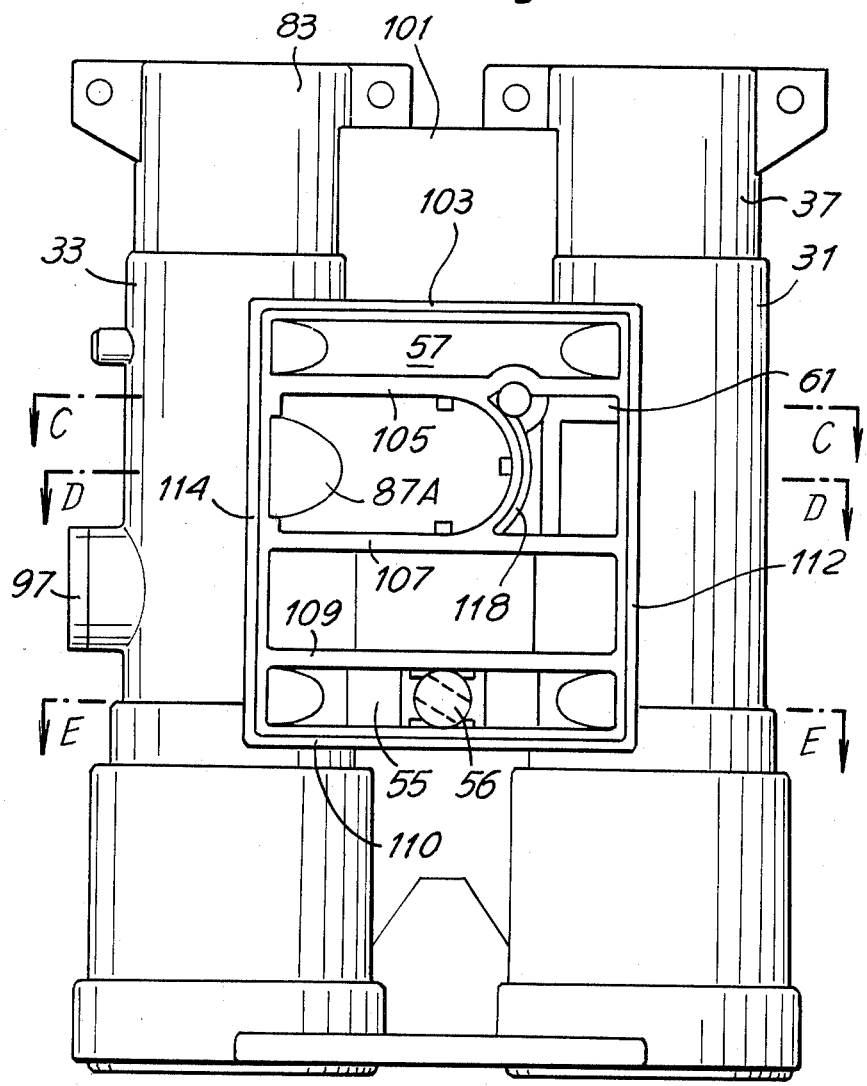

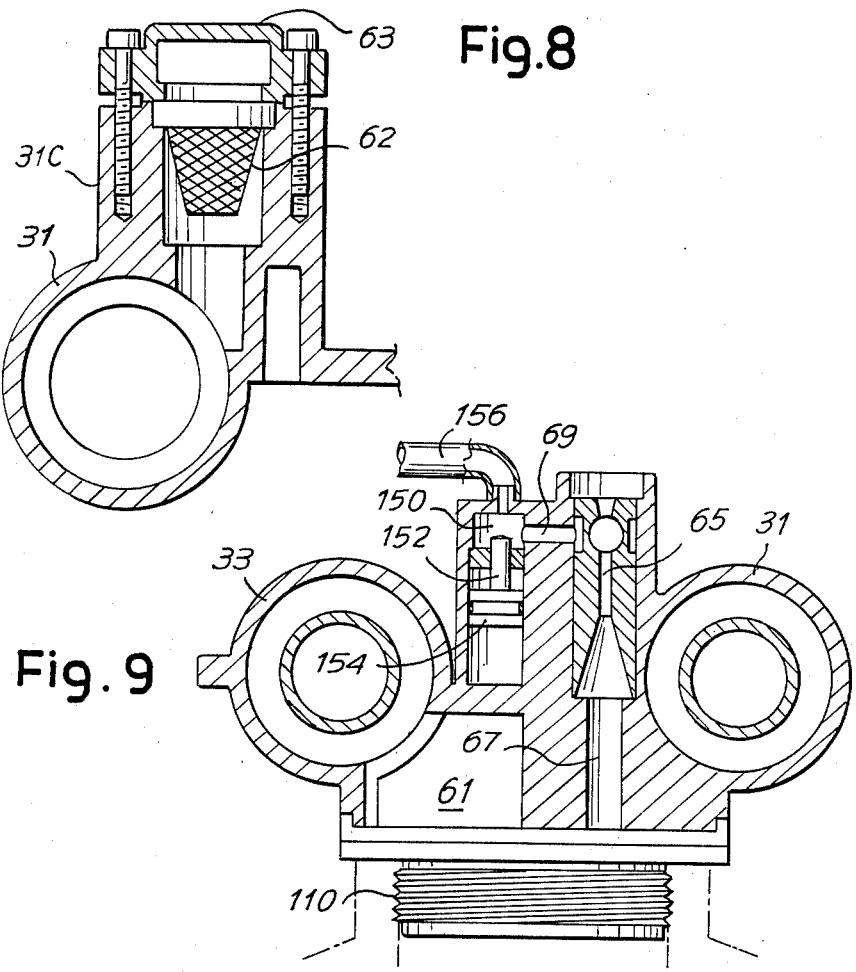
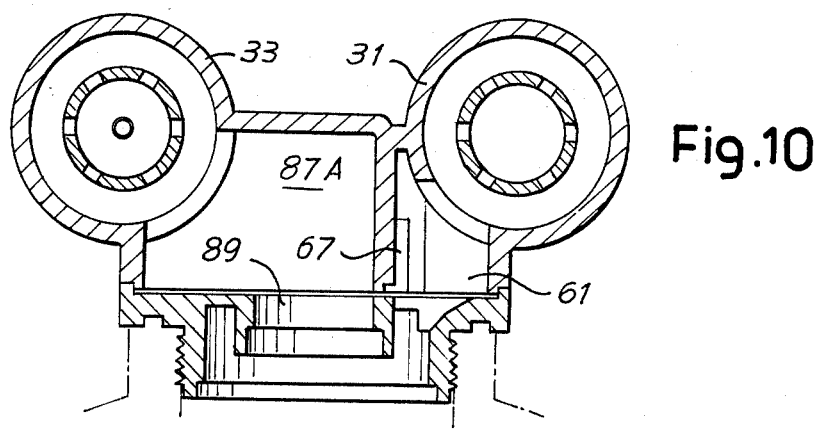

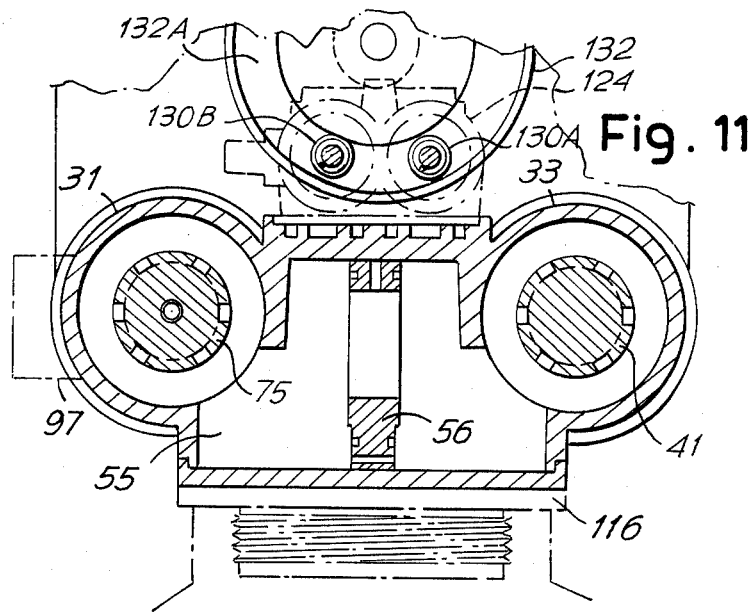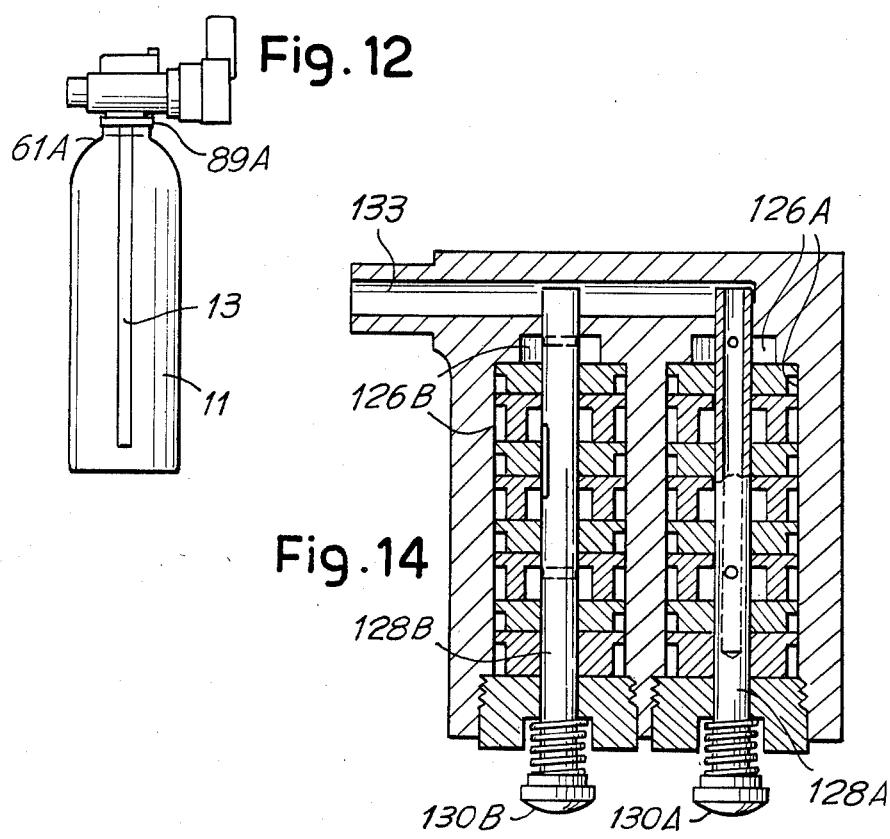

DOUBLE MULTIPLE CHANGE-OVER VALVE, FOR CONTROLLING THE OPERATION OF A WATER TREATMENT PLANT

This is a continuation of application Ser. No. 356,303, filed 3/10/82.

FIELD OF THE INVENTION

The present invention relates to a double multiple change-over valve, for controlling the operation of a water treatment plant.

SUMMARY OF THE INVENTION

According to the invention, there is provided a double multiple change-over valve for controlling the operation of a water treatment plant including a resin column, said valve, comprising a moulded plastics body defining two valve units each valve unit including a seat, a movable assembly in the seat, and piston means controlling the assembly to position the assembly in a selected one of two positions, each of said movable assemblies comprising an end portion including a cavity with lateral apertures, and an intermediate portion including longitudinal passage means, means defining annular throats around said movable assemblies, means defining passages communicating with the throats and with the top and bottom of the column, the cavity and the longitudinal passage means in each movable assembly cooperating with the throats to provide different flow paths in the respective positions of the movable assembly, a discharge port, and a suction feeder for feeding regenerating solution to the column, said feeder including venturi means operative when the valve connects the column to the discharge port, to draw in the regenerating solution and wash the resin.

Preferably the two movable assemblies are controlled in such a manner as to attain a first position in which the water flows to the user after treatment; a second position in which the flow is in the reverse direction in order to disturb resins in the column; a third position for regenerating the resin and for a possible slow wash; and a fourth position for rapidly washing the resin.

Means are advantageously provided for intermittently feeding the regenerating solution to the venturi. Such means can comprise a valve controlled synchronously with one of said movable assemblies, and by the same control means therefor.

The passages in the valve body include transverse passages formed by transverse walls constructed by moulding, and by covering and connection means.

Advantageously, the valve can comprise flow measurement means combined with a passage provided in one of the movable assemblies of the valve. In particular, the measurement means can be mounted on the movable assembly combined with the outlet, and thus replaceable together with the movable assembly. A magnetic coupling can be provided in order to transmit the motion of the measurement means in the form of measurement pulses.

BRIEF DESCRIPTION OF THE DRAWINGS

An embodiment of the invention will now be described by way of example only with reference to the accompanying diagrammatic drawings, in which:

FIGS. 6 and 7 are two outer views of the valve, but without components normally fitted to the main body;

FIGS. 8, 9, 10, 11 are sections respectively on lines A—A of FIG. 6, and C—C, D—D and E—E of FIG. 7;

FIG. 12 shows schematically the valve and associated resin column;

FIG. 14 is a local section on the line F—F of FIG. 13.

DESCRIPTION OF THE PREFERRED EMBODIMENT

Figure 1:
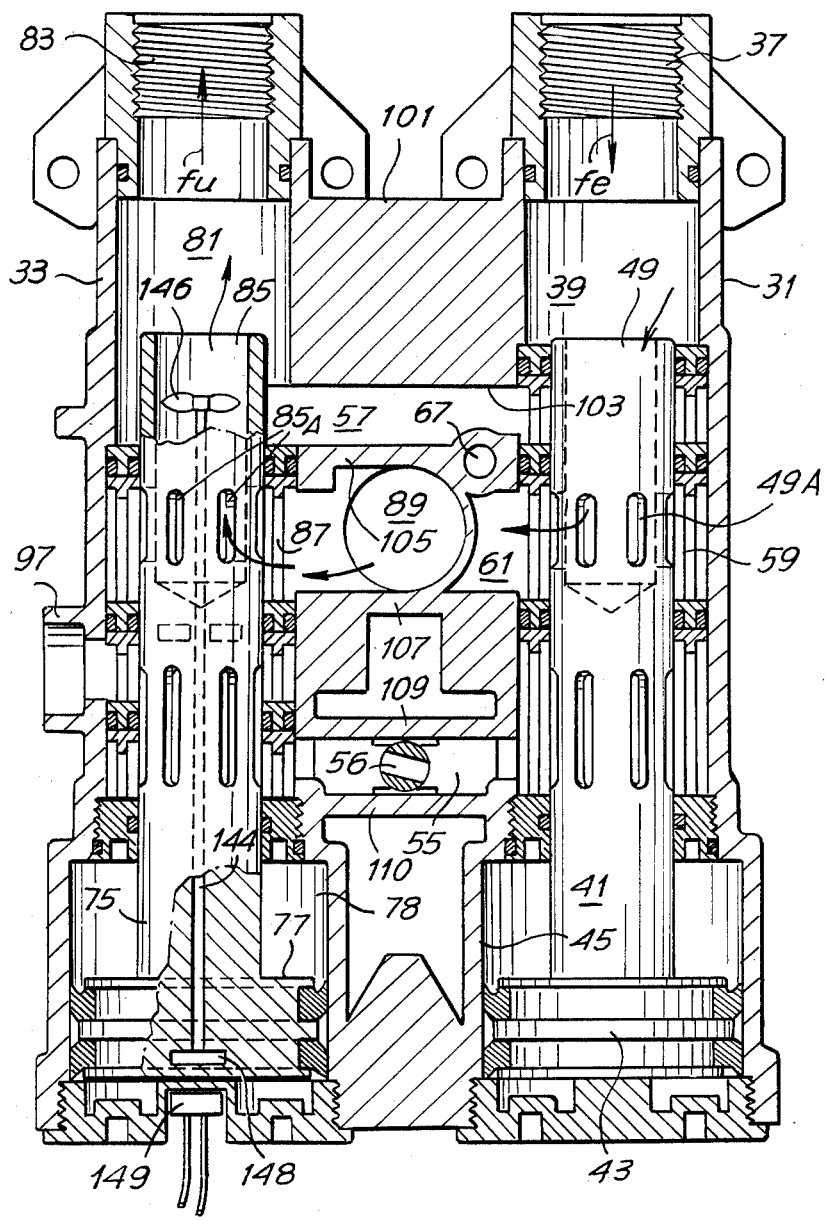
FIGS. 1 to 4 are sections showing a valve in accordance with the invention during each of four operating stages.

As shown in the accompanying drawings, the reference numeral 31 indicates a valve unit disposed at the inlet of the fluid to be processed, and in particular impure water to be treated by a softening or demineralising device in a column with ion-exchange resins of known type. The reference numeral 33 indicates a second valve unit analogous to the unit 31, combined with the column outlet. More specifically, the unit 31 is combined with the top of the column, and the unit 33 with the bottom of the column.

Figure 13:
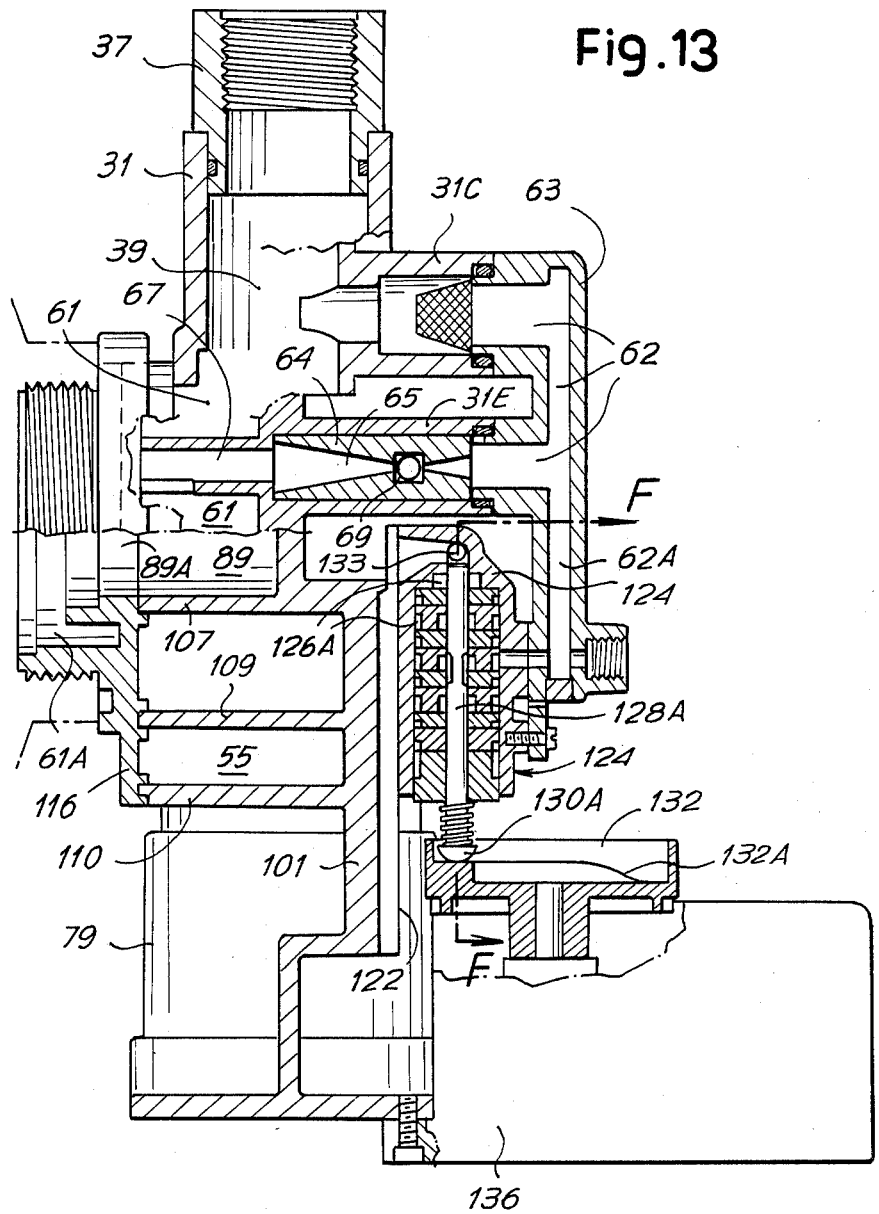
FIG. 13 is an overall longitudinal section of the valve.

The reference numeral 37 indicates the inlet connector of the unit 31, which leads to a chamber 39. A movable assembly 41 of the unit 31 terminates in the chamber, the movable assembly comprising a piston 43 slidable in a cylinder 45, a set of longitudinal grooves 47, and a cylindrical terminal part in which an axial passage 49 and lateral outlet slots 49A are provided. An annular throat 52 and a second annular throat 53, each in a position corresponding to a respective connection 55 and 57 leading to the casing of the unit 33, are formed in the casing of the unit 31 by means of spacers 50 ... 50H and seal rings 51 around the movable assembly 41. In the connector 55 there is disposed a cylindrical regulator 56 which can be adjusted in position in order to vary the flow through the connector. A further annular throat 59 is formed by the spacers in a position corresponding to a passage 61 which reaches the top of the resin column by way of an annular connector 61A. The chamber 39 is connected—by way of a passage 62 containing a filter and formed in a connector 31C, in a connector 31E and a member 63 fitted to the connectors—to a seat formed in the connector 31E for a block 64 comprising a passage in the form of a venturi tube 65 (see FIG. 13). The passage 62, 65 is completed by a portion 67 which opens into the annular connector 61A. The reference numeral 69 indicates a duct through which a resin regenerating solution arrives. The passage formed by the venturi tube 65 substantially reaches the duct 61 serving the top of the column.

The unit 33 comprises a casing with a slide seat for an axially movable assembly 75 which can be controlled by a piston 77 movable in a cylinder 78. The movable assembly 75 is guided within spacers 79A ... 79H with seal rings 80. The end of the movable assembly 75 opens into a chamber 81, which is combined with an outlet port 83. This end of the movable assembly 75 comprises an axial passage 85 similar to the passage 49, with slots 85A which can open either into a chamber 81 or into a throat 87 (formed between the spacers 79B-79C) which communicates by way of a passage 87A and a connector 89 (inside the connector 61A) with the bottom of the resin column. The movable assembly 75 comprises grooves 91 similar to the grooves 47, with which there can cooperate two annular throats 93 and 95 defined by the spacers 79H, 79G and 79F, 79E in the seat of the movable assembly 75. The throat 95 communicates with a discharge port 97, the throat 93 communicates with the connector 55, and the connector 57 opens into the chamber 81.

As can be seen from the drawing, the bodies of the two units 31 and 33 are formed in a single moulded piece together with a connection zone indicated overall by 101, in which the connectors 55 and 57 and the passages 61 and 87A are provided. In order to allow injection moulding using synthetic resin, the connectors 55, 57 and the passages 61 and 87A are formed by means of transverse walls 103, 105, 107, 109 and 110, which extend perpendicularly to the axes of the seats for the movable assemblies 41 and 75. These walls together with longitudinal walls 112 and 114 define a box structure and a surface which serves to receive a rectangular plate element 116 for closing purposes, this being welded or glued to the perimetral edge defined by the walls 103, 112, 110, 114, and to the edges of intermediate walls 105, 107 and 109, so as to bound and complete the connectors 55, 57 and passages 61 and 87A, which are further separated from each other by a curved wall 118. The closure element 116 forms, in an intermediate position, the extension 89A of the connector 89 which connects to the bottom of the resin column, and around the extension 89A the element 116 forms the annular connector 61A connected to the passage 61 for connection to the top of the resin column.

By means of this configuration of the walls 103, 105, 107, 109 and 110, and the configuration of the connectors 31C and 31E, it is possible to form the passages for the water circulation by moulding, the only further operation necessary being the insertion of the block 64 forming the venturi tube and the components 63 and 116.

On the same side as the connectors 31C, 31E (and thus on the opposite side of the walls 103, 105, 107, 109, and 110 and the element 116) there is further formed a flat profiled seat, indicated by 122 for receiving a block 124 housing two distribution slide valves. More specifically, the seat 122 comprises two channels 122A, 122B which reach the outer end of the cylinders 45 and 78 respectively, through small passages 122C and 122E. Further channels 122F, 122G in the seat 122 reach passages 122H and 122L respectively for the two cylinders 45 and 78, their purpose being to selectively control the two control pistons 43 and 77 of the movable assemblies 41 and 75 by means of the two valves housed in the block 124. In order to feed either the channels 122A, 122F or 122B, 122G, each of these valves comprises a seat 126A, 126B respectively, with piles of discs defining headers, and a respective distribution slide valve 128A, 128B driven in one direction by elastic means and in the reverse direction by tappets 130A, 130B cooperating with an annular track 132A on a rotating cam 132 disposed in front of the block 124. Each of the distribution slide valves 128A, 128B comprises outer grooves and a central bore to allow discharge through a discharge duct 133 combined with a duct 97B. The cam 132 is rotated by means of the output shaft of a timer device 136 disposed on the described block and operating in a known programmable manner. The timer operates the distribution slide valves 128A, 128B by way of the cam 132, in such a manner as to feed the driving water to the cylinders 45 and 78 and thus move their pistons 43 and 77, so as to effect the stages described hereinafter. The pressurised water reaches the valves in the block 124 through a branch 62A of the passage 62 which is fed with the water arriving from the connector 37, the branch 62A also being formed in the member 63. The block 124 is fixed into the seat 122 by plasticisation, or by solvents or mastics.

As stated, the duct 69 feeds the resin regenerating solution (such as brine), which is drawn in by the effect of the passage of water through the venturi passage 65, firstly towards the connector 67 and then towards the connector 61A connected to the top of the resin column. The metered feed of the regenerating solution, which is fed through the duct 69, can be attained using controlled delivery from a solution tank, based on the level reached in it by said solution, using a float valve or the like for maximum level, and a valve for minimum level, this latter valve in all cases being required in order to prevent air entry into the passage 69. The metered feed of the solution can also be attained on a time basis using a flow meter and a valve controlled by a distributor combined with the block 124, to cause the duct 69 to open for programmable times, again using a float valve for minimum level. The drawing shows an arrangement of this kind. The passage 69 opens into the chamber 150 of a valve 52 controlled by a cylinder-piston system 154. The system 154 is controlled simultaneously with the piston 75 in order to open the valve 154 when the piston 75 is moved into the position of FIGS. 3 and 4. A pipe 156 with a flow meter is connected to the solution tank.

The discharge port 97 is combined with an elbow connector 97A, holding a flow regulator 98 arranged to ensure constant throughput as the pressure varies. The connector 97A is connected for safety reasons to a peg 33M formed laterally on the unit 33. The connector 97A also receives the discharge pipe 97B from the unit 124.

A softened water meter can be associated with the described unit in order to determine when regeneration is required. This meter can be combined with a programmer for the regeneration cycle. A meter of this kind can be constituted by a rotating element held coaxially in the assembly 75 to operate when the unit is in the position shown in FIG. 1. The meter comprises a spindle 144 rotatably mounted in the assembly 75, the spindle 144 projecting into the passage 85 where it carries at its end a propeller 146 which rotates when struck by the water stream in the direction of the arrows of FIG. 1 flowing towards the user item by way of 49, 61, 89, 85A and 85. At the opposite end to the propeller 146, the spindle 144 carries a magnetic bar 148, able to act on a reed switch 149, which thus receives pulses as the propeller 146 rotates, so measuring the flow of softened water.

The operation of the valve is as follows:

FIG. 1 shows the operating position. In this position, the impure water entering in the direction of the arrow $F_E$ into the chamber 39 through the inlet port 37 is able to reach the venturi tube 65 from the passage 62, and a small flow of water can take place through the passage 62 and the passage 67 as far as the passage 61, 61A. However, most of the water passes through the passage 49 and throat 59 to reach the passage 61 and the top of the resin column 11. The impure water is treated in the column by passing slowly downwards until it reaches the bottom of the column 11, after which, by way of the return pipe 13, the duct 89A, 89, the passage 87A, the throat 87, the slots 85A, the passage 85 and the chamber 81, it reaches the outlet port 83, from which it passes to the user in the direction of the arrow $f_U$ at the water outlet. The two movable assemblies 41 and 75 are both positioned in their left-hand positions as viewed in the drawing. All control movements can be obtained by hydraulic systems, which act on the respective cylinder-piston systems 43, 45; 77, 79.

When the resins are to be regenerated by means of a regenerating solution supplied through the duct 69, an initial operation involving disturbing the resin bed by means of a countercurrent through the column 11 is first carried out. The actual resin regeneration is then carried out by means of a regenerating solution originating from the duct 69, with the regenerating solution moving slowly through the resin mass to be regenerated, after which the resins are subjected to a final wash at a limited throughput. These various stages are shown in FIGS. 2, 3 and 4 respectively.

Figure 2:
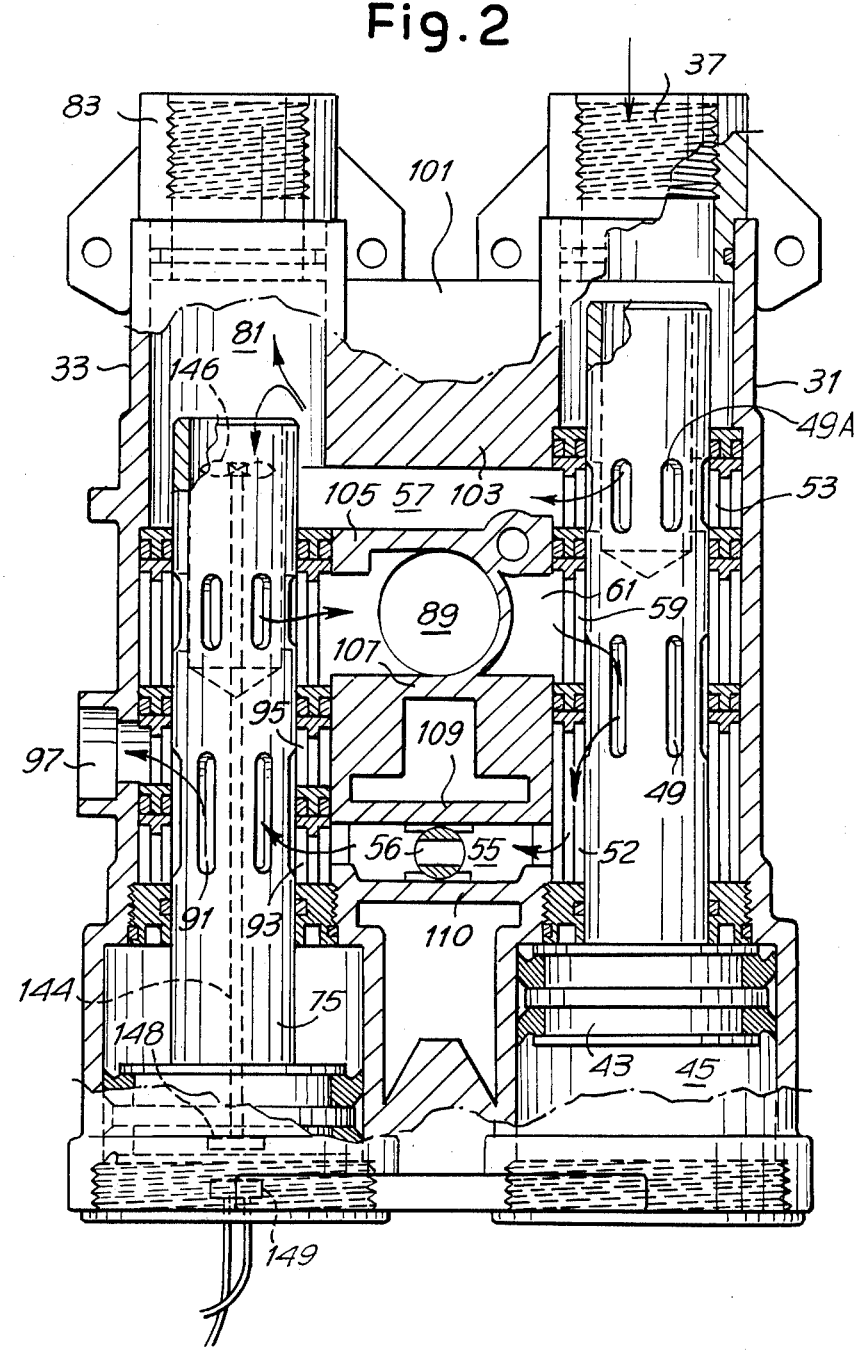

FIG. 2 shows the position for obtaining the countercurrent flow of water in order to disturb the resin bed, as as a prior operation to the regeneration. This operation is carried out by moving the movable assembly 41 towards the right (with reference to the drawing). This movement positions the grooves 47 between the throat 59 and the throat 51. In addition, the lateral mouth 49A of the passage 49 moves from the throat 59 to the throat 53. By this means, the impure water passes from the inlet 37 to the chamber 81 and from here partly to the outlet 83, if this is open (if there is a requirement for water), and partly to the duct 89 in order to feed the resin column from the bottom. The water which has flowed countercurrently into the column from the bottom upwards reaches the duct 61, and from here, by way of the throat 59, grooves 47, throat 52, passage 55, throat 93, grooves 9 and throat 95 reaches the discharge port 97. This provides a countercurrent in the resin column 11, which thus has the effect of disturbing the resin bed immediately before the regeneration using a relatively slow current of impure water.

Figure 3:
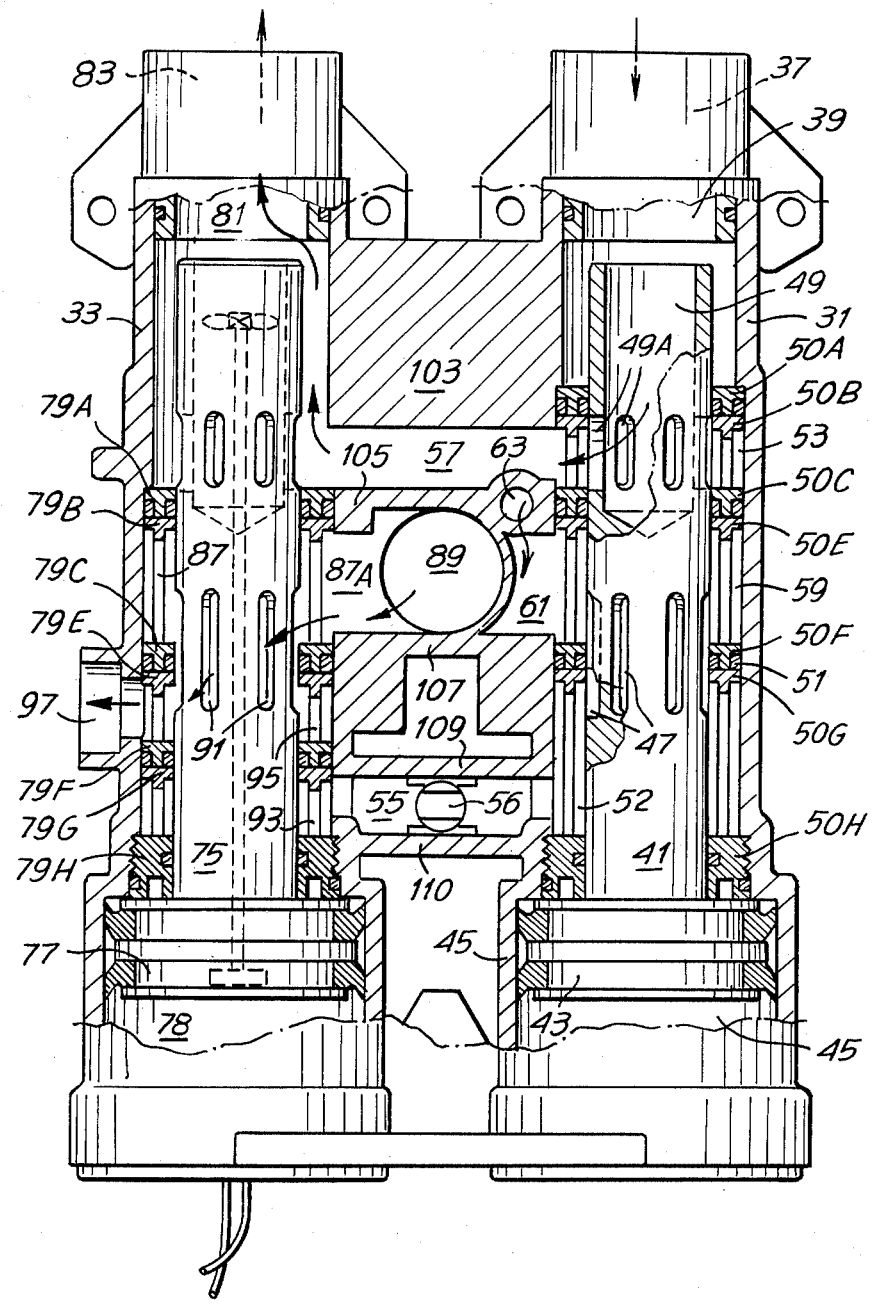
Figure 4:
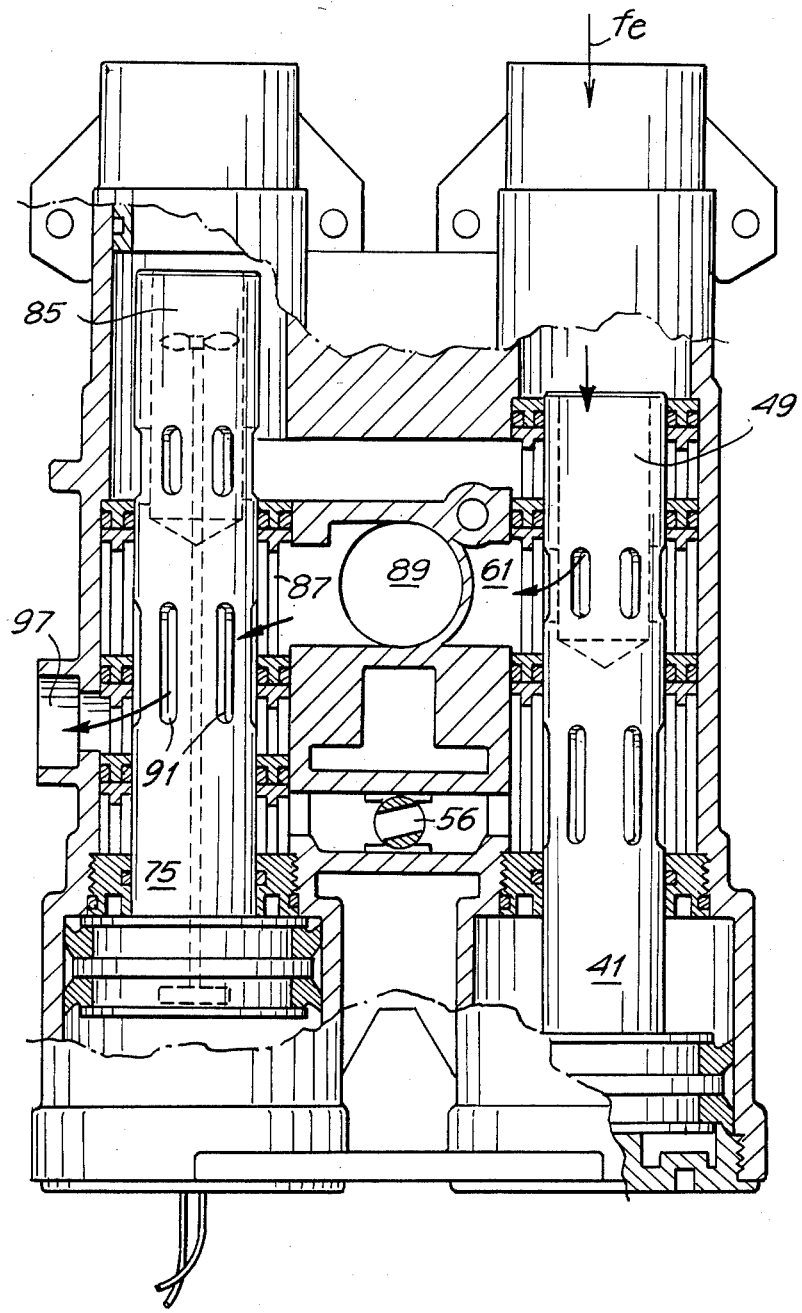
Figure 5:
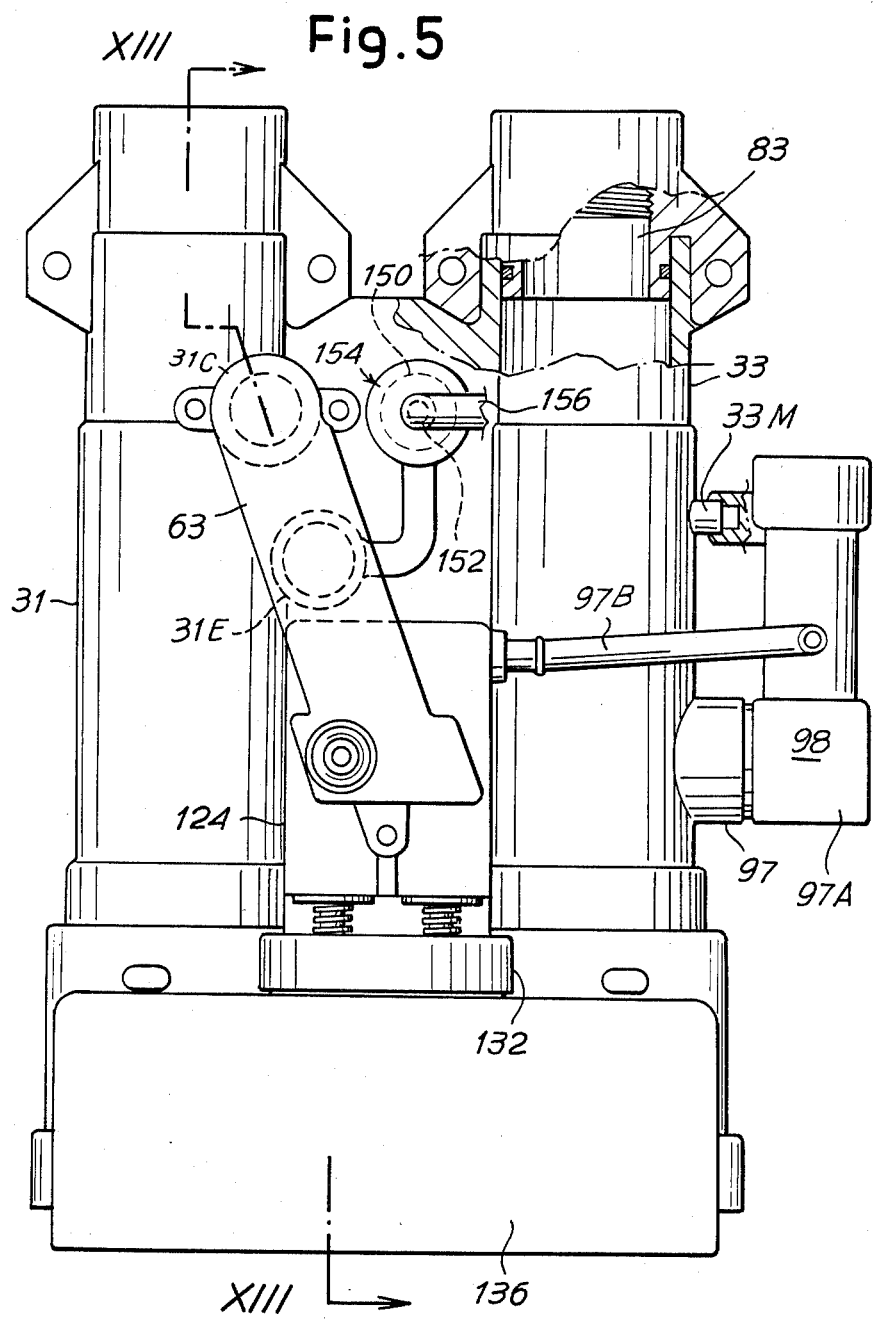
FIG. 5 is a plan view of the valve.
Figure 6:
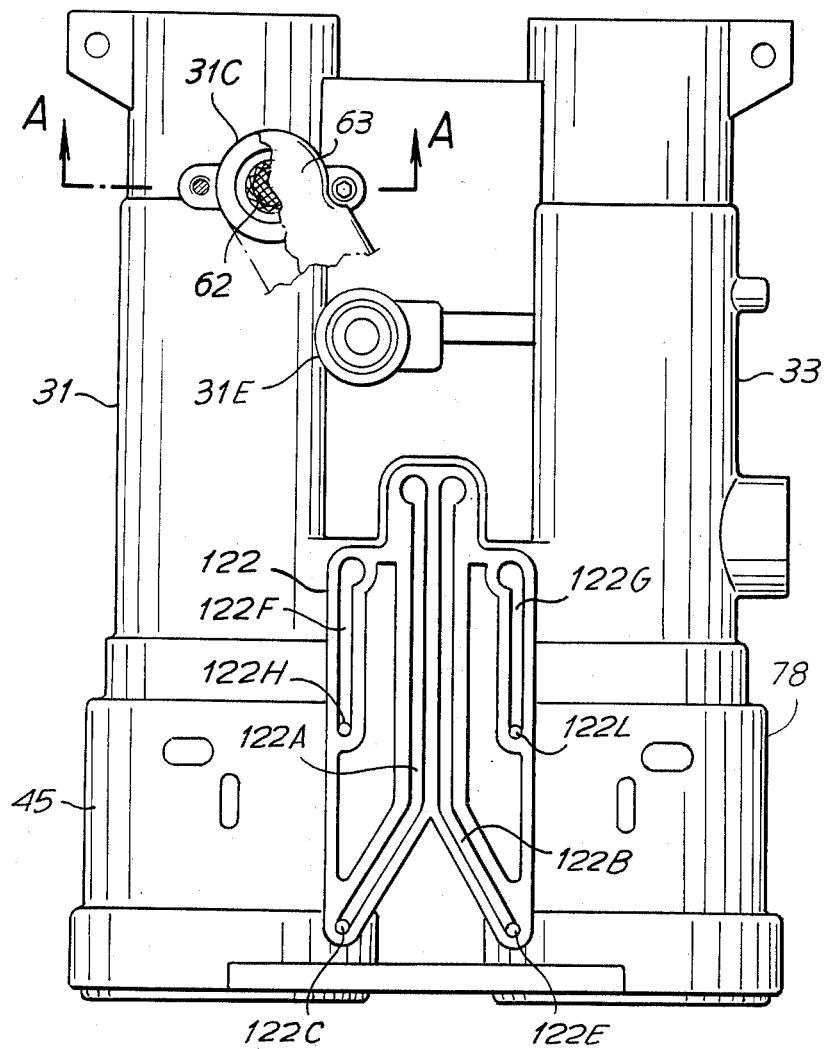

FIG. 3 shows the position for regenertion purposes. This position is attained by moving a movable assembly 75 towards the right (with reference to the drawing). Under these conditions, part of the impure water originating from the passage 62 is mixed with the regenerating solution originating from the duct 69 and from the pipe 156, by virtue of the pressure differential created in the circulation, and by the opening of the valve 152 controlled by one of the slide valves of the block 124 by means of the system 154 together with the piston 75. The mixture formed from the regenertion solution and the impure water passes through the duct 67 to reach the duct 61 and thus the top of the column 11, its throughput being limited to that obtainable through the constricted cross-section represented by the venturi tube 65. Mixing is carried out by the effect of the passage of impure water through the venturi tube 65 due to the pressure difference between the inlet 37 and the top of the column 11, the bottom zone of which is connected to discharge by way of the passages 87A, 87, 91, 97 (FIG. 3). The water slowly takes the conventional purification path through the column, mixed with the regenerating solution, in order to reach the duct 98 and flow from the discharge port 97 by way of the throat 87, the channels 91 and the throat 95. The regenerating solution ceases to be drawn in when its level is lowered to the limit established by a minimum float valve, or to the limit at the moment of reversal of the control movement obtained simultaneously with the control movement of the piston 75.

After the resin regeneration stage has been carried out, a first wash stage is effected such that the regenerating solution moves slowly through the resin mass and is then removed from the column 11. This removal stage is attained when the regenerating solution ceases to arrive from the pipe 156 and duct 69 which feed it, whereas impure water still continues to pass slowly through the restricted cross-section of the venturi tube 65 as far as the duct 61 and the top of the column. Thus after the slow passage of the solution mixed with impure water, impure water alone passes through the column from the top to the bottom, and is removed through the discharge port 97. By reversing the connections, regeneration can take place in countercurrent. The slow replacement of the mixture of impure water and regenerating solution by impure water alone in the resin column enables the regenerating solution to be utilized to the maximum extent in treating the resins. The rapid wash stage then takes place.

This rapid wash stage takes place when the position shown in FIG. 4 is attained, i.e. with the mobile assembly 41 moved to the left (with reference to the drawing). By this means, the impure water which enters from the connector 37 in the direction of the arrow $f_E$ again directly reaches the duct 61 through the passage 49 and slots 49A, and then passes through the column 11 to reach the pipe 13 and the passage 89 by way of the bottom of the column, to be discharged from the discharge port 97 by way of the channels 91. By this means, the final resin wash is attained using a throughput which is limited by the cross-section of the discharge passage 97. During this stage, the valve 52 remains open, and the impure water in the ducts 62 and 69 is able to reach the salt container by way of the pipe 156, so as to reform the solution using a quantity of impure water determined by the time for which the positio shown in FIG. 4 continues, and by the flow meter mounted in the pipe 156.

After this relatively rapid wash stage in the position shown in FIG. 4, the position shown in FIG. 1 is again attained, which represents the normal operating conditions for treating the impure water, in order to obtain purified water at the outlet in the direction of the arrow $f_U$.

What is claimed is:

1. A double multiple change-over valve for connection to a resin column of a water treatment plant, said valve unit comprising a molded plastic body defining two cylindrical valve units, the cylindrical valve units being disposed parallel to each other and spaced apart by a connecting portion therebetween, each valve unit including a cylinder having an open end forming a port, the port of one of said cylinders forming an inlet port, the port of the other of said cylinders forming an outlet port, a movable assembly having a first and second ends slidable between first and second positions in said cylinder, piston means disposed at the first end of said movable assembly, said second end of said movable assembly including a first hollow cavity, lateral apertures disposed proximate said first hollow cavity and an open end for fluid communication between said first hollow cavity and said cylinder port, and an intermediate portion separate from said second end including a second hollow cavity having apertures through which fluid may flow, spacer and gasket means for forming annular throats about said movable assembly, said connecting portion of said valve body including transverse passage communicating with said annular throats, said connecting portion of said valve body including passages for fluid communication between said cylinders and said resin column, said connecting portion of said valve including concentric passages for connection to the top and bottom connections of the resin column, and said connecting portion of said valve body further including regenerating solution feeder passages for fluid communication with said resin column, said feeder passages including venturi means.

2. A valve as claimed in claim 1, comprising means for intermittently feeding the regenerating solution to the venturi means.

3. A valve as claimed in claim 2, wherein said feed means comprise valve means controlled synchronously with one of said movable assemblies.

4. A valve as claimed in claim 1, further comprising flow measurement means associated with one of movable assemblies of the valve.

5. A valve as claimed in claim 1 wherein said movable assemblies are independently slidable within said valve units to define four positions, a first position in which both valve units are disposed in their first position, a second position in which the first valve unit is in its first position and the second valve unit is in its second position, a third position in which said first valve unit is in its second position and said second valve unit is in its first position and a fourth position in which said first and said second valve units are in their second positions; said four positions of said valve units providing four separate fluid flow paths between said valve units and said transverse passages.

6. A valve as claimed in claim 4 wherein said flow measurement means comprise magnetic means rotatably mounted within one of said movable assemblies, said magnetic means being rotated upon fluid flow therethrough to generate magnetic pulses, and receiver means mounted externally of said movable assemblies for receiving and detecting the magnetic pulses caused by the rotation of said magnetic means.

* * * * *